G. A. SEXTON.
BELT SHIFTING DEVICE.
APPLICATION FILED OCT. 12, 1916.
1,241,036.
Patented Sept. 25, 1917.
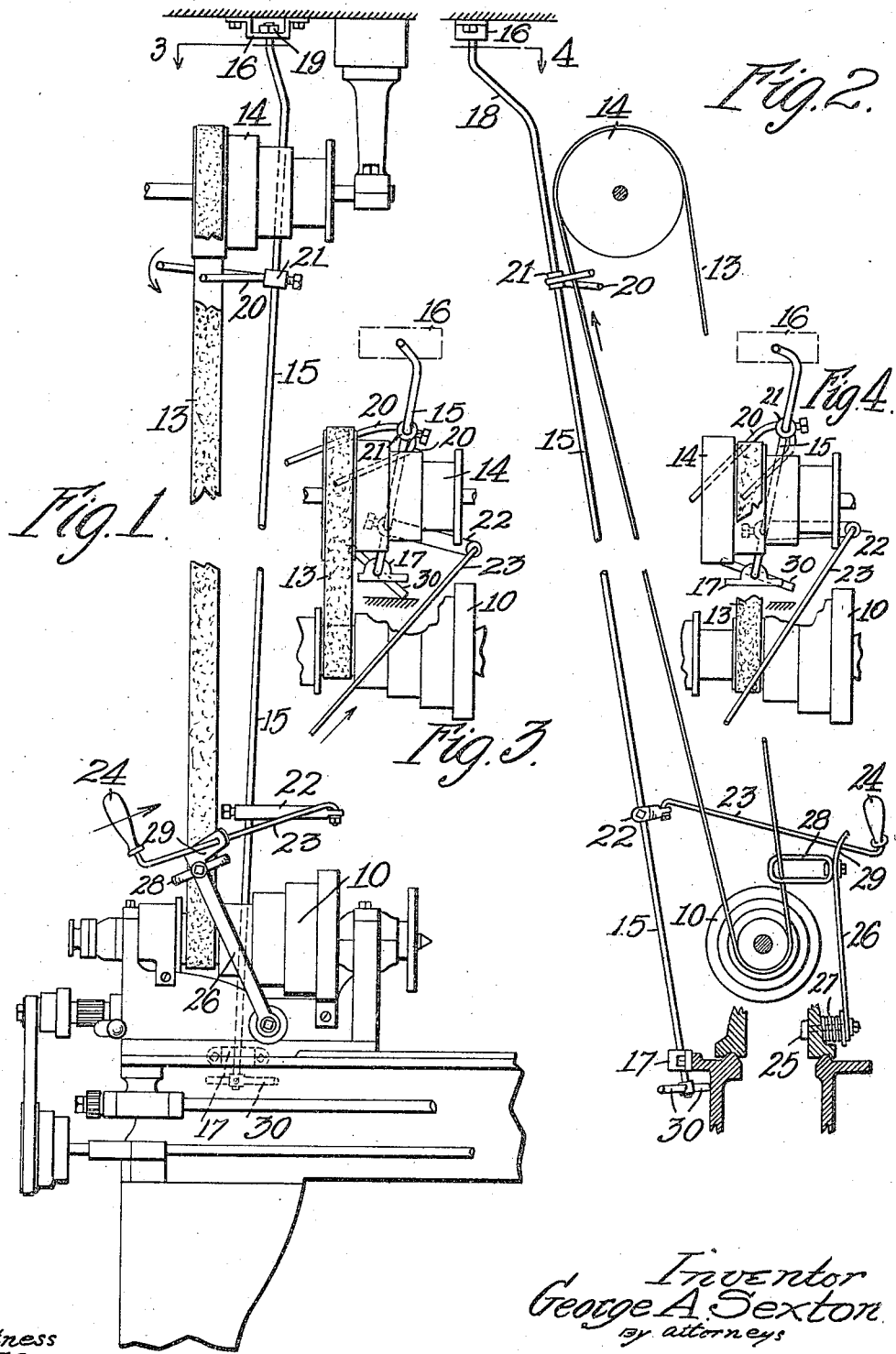

UNITED STATES PATENT OFFICE.

GEORGE A. SEXTON, OF FITCHBURG, MASSACHUSETTS.

BELT-SHIFTING DEVICE.

1,241,036.  Specification of Letters Patent.  Patented Sept. 25, 1917.

Application filed October 12, 1916. Serial No. 125,299.

*To all whom it may concern:*

Be it known that I, GEORGE A. SEXTON, a citizen of the United States, residing at Fitchburg, in the county of Worcester and State of Massachusetts, have invented a new and useful Belt-Shifting Device, of which the following is a specification.

This invention relates to a mechanism for shifting belts on cone pulleys, and the principal objects thereof are to provide an arrangement of this kind adapted for speeding up machinery and thus economizing in the production of the product, and also to provide an arrangement which will not endanger the workman who has to attend to the shifting of the belts.

In order to accomplish these results in a satisfactory manner, the invention also involves means whereby a fork which engages one strand of the belt is mounted to turn with a rod which itself swings so as to give the fork a forward arcuate motion; to provide means whereby a single handle is adapted to control the shifting and guiding of both strands of the belt, and to provide a device which will stay in any position in which it is left without danger of its moving and thus accidentally shifting the belt.

Further objects and advantages of the invention will appear hereinafter.

Reference is to be had to the accompanying drawings, in which—

Figure 1 is a front elevation of a preferred embodiment of this invention shown as applied to cone pulleys of a lathe;

Fig. 2 is a transverse sectional view of the lathe taken in a plane to show the belt shifting device in end elevation, and Figs. 3 and 4 are sections on the horizontal line 3—4 of Figs. 1 and 2 showing the main portion of the belt shifter in plan and indicating two positions of the belt and shifter.

It is well known that the most difficult belt shift is that from the next to the highest to the highest speed, namely that from next to the largest to the largest part of the cone which supplies the machine with power at the highest efficiency ordinarily. For this reason it is found in practice that many workmen after attempting to shift to the highest speed, will have a tendency to leave the belt at the next to the highest step of the cone so as to avoid the difficulty and danger of this shift. For this reason many machines are run throughout the country at a lower speed than that at which they could run with the most efficiency, and one of the important objects of this invention is to provide an apparatus which will make this last shift as easily as the others, and consequently tend to prevent this loss in efficiency which is so common. The device is also designed to prevent the employees touching the belt at all with their hands, and consequently it serves as a safety device.

In the form shown in the drawings the invention is applied to a lathe having a cone pulley 10 of the usual construction driven by a belt 13 from a cone pulley 14 on the counter-shaft. The belt shifting device comprises a rod or shaft 15 which extends from the body of the machine to the ceiling or some other convenient support and is provided with a bearing bracket 16 at the top and a bearing bracket 17 at the bottom on the bed of the lathe or the like to which it is applied. This shaft or rod is straight throughout the greater part of its length, but is provided with an offset or bend 18 above the upper cone pulley 14 which gives that part of the rod an arcuate motion when turned in its two bearings. It is supported against motion downwardly by a washer and nut or the like 19 at the top.

This rod is provided with a fork 20 consisting of two arms extending from a collar 21 fixed to the rod by a set screw or the like and adapted to engage the rear strand of the belt 13. Figs. 3 and 4 show that this fork extends from the rod at an angle to the plane defined by the two pivots in the brackets 16 and 17 and the point at which the fork is mounted on the rod. For the purpose of turning the rod on its pivot it is provided with a projecting arm 22 to which is pivotally connected an operating rod 23 having a handle 24 for manipulating it. It will be obvious that the rod 15 can be turned by pushing and pulling on this handle.

For controlling and shifting the other strand of the belt I have shown a stud 25 secured on the lathe on which is pivoted an arm 26 frictionally held in any position in which it is placed by a spring 27 on the stud between the arm and the side of the lathe. This arm is provided with a loop 28 which constitutes a fork for the front strand of the belt, this being fixed to the arm in a position in a plane transverse to it. The arm is also provided with a projection 29 having a perforation for receiving the rod 23 so that this rod is supported by the arm 26. Furthermore, the operation of pushing or pulling on the handle 24 having been accomplished to turn the fork 20 the operator can swing the handle about its pivot and move the arm 26 with it about its pivot so as to control the shifting of this strand of the belt.

On the rod 15 is a radial stop arm 30 adapted to engage the side of the lathe to limit the motion of the device so as to prevent its accidentally being moved to throw the belt off the large step of the upper cone. When in the position shown in Figs. 1, 2 and 3, it has this effect but in all other positions it is not in contact with anything and therefore does not prevent the action of the shipper.

Although the operation of the device has clearly been described above I will call attention to the motion of the fork 20 as indicated in Figs. 3 and 4, in which it will be observed that the fork not only moves through an arc, but the rod 15 on which it is fixed, also moves so that the fork has a forward arcuate swinging motion. This serves to lift the belt up on the rear of the pulley 14 when shifting upwardly on that pulley, and constitutes a very different motion from a simple swinging on its own axis. The operation of shifting downwardly on this pulley and upwardly on the lower pulley is, of course, less difficult and is controlled within easy reach of the operator by the member 28.

Although I have illustrated and described only a single form of the invention I am aware of the fact that modifications can be made therein by any person skilled in the art without departing from the scope of the invention as expressed in the claims. Therefore, I do not wish to be limited to all the details of construction herein shown and described, but what I do claim is:—

1. In a belt shifting device, the combination of a supporting rod pivoted at its ends, said rod having an offset therein, and a belt shifting fork on said rod near the offset and movable with the offset.

2. A belt shifting device comprising a supporting rod pivoted at its ends, said rod having an offset therein, and a belt shifting fork located on the rod at a point near the offset and extending from the rod at an angle to a plane defined by the two pivots at the ends of the rod and the point at which the fork is mounted on the rod.

3. In a belt shifting device, the combination of a supporting rod pivoted at its ends, said rod having an offset portion, and a belt shifting fork on said rod and movable therewith, means for swinging the rod on its pivots, and a stop fixed to and projecting from the rod for engaging a stationary surface and limiting the movement of the rod so as to prevent its being operated to shift the belt off the end of a cone pulley.

4. In a belt shifting device, the combination of a supporting rod pivoted at its ends, said rod having an offset, a fork secured to said rod near the offset for shifting one strand of a belt, said rod having an arm extending radially therefrom for swinging it on its pivots, a rod connected with the end of said arm and adapted to swing the arm and rod by a longitudinal motion, and means connected with the second rod for controlling the shifting of the other strand of the belt.

5. In a belt shifter, the combination of a pivoted arm, means for frictionally holding the arm in any position in which it is placed, said arm having thereon a device for engaging and shifting the front strand of a belt and having a perforation, an operating rod extending through said perforation, a substantially vertical supporting rod, an arm projecting therefrom and pivotally supporting one end of the operating rod, whereby said operating rod may be turned about its pivot for moving the first named arm and can be moved longitudinally for turning the second arm and oscillating the vertical rod, said vertical rod being provided with a belt engaging fork for the rear strand of the belt.

6. In a belt shifter, the combination of a pivoted arm, means for frictionally holding the arm in any position in which it is placed, said arm having thereon a device for engaging and shifting the front strand of a belt, an operating rod, a substantially vertical supporting rod, means whereby said operating rod may be turned for moving the first named arm and can be moved longitudinally for oscillating the vertical rod, said vertical rod being provided with a belt engaging fork for the rear strand of the belt.

In testimony whereof I have hereunto affixed my signature.

GEORGE A. SEXTON.

Copies of this patent may be obtained for five cents each, by addressing the "Commissioner of Patents, Washington, D. C."